United States Patent Office 3,316,213
Patented Apr. 25, 1967

3,316,213
PROCESS FOR PREPARING AROMATIC POLYAMIDES AND POLYOXAZOLES
Charles E. Berr, Wilmington, Del., assignor to E. I. du Pont de Nemours and Company, Wilmington, Del., a corporation of Delaware
No Drawing. Filed Dec. 16, 1963, Ser. No. 330,538
2 Claims. (Cl. 260—47)

This invention relates to novel shapeable or tractable polymeric compositions and, more particularly, to the preparation of the tractable polymeric compositions, their formation into shaped articles, and their conversion into substantially intractable polymeric articles. As used in the present specification, "shapeable" refers to the ability of the polymeric compositions to be shaped into useful structures by extrusion through dies, casting as films, coating on substrates, or by similar processing.

The outstanding physical and chemical properties of certain polymers make them extremely useful in the form of shaped structures such as films, filaments, tubing, etc. However, the same outstanding physical and chemical properties make it extremely difficult to shape these polymers into useful structures. One purpose of the present invention is to provide a group of polymeric compositions having satisfactory physical and chemical properties, but which can easily be formed into shaped structures. A further purpose is to prepare polymeric compositions which, in the form of shaped structures, can be converted into polymers having even more outstanding physical and chemical properties.

Specifically, the object of the present invention is to provide shapeable compositions of certain substituted polyamides. A further object is to provide shaped structures of these polyamide compositions. A still further object of the invention is to convert the polyamide structures to structures of polymers having even more desirable properties than the polyamides, e.g. structures of polybenzoxazoles. Other objects will appear hereinafter.

The objects are accomplished by a composition containing at least one polyamide having the following structural formula:

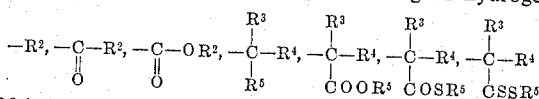

wherein
R is an aromatic tetravalent radical;
R$^1$ is arylene;
—X is selected from the group consisting of hydrogen,

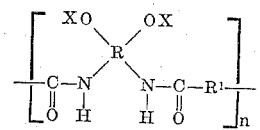

R$^2$ being lower alkyl (up to six carbon atoms) and R$^3$, R$^4$ and R$^5$, each being selected from the group consisting of hydrogen and R$^2$, X being preferably hydrogen and —R$^2$; and wherein
$n$ is an integer sufficient to provide a film-forming polyamide, i.e. having an inherent viscosity of at least 0.1, preferably 0.5–5.0, as measured at 30° C. as a 50% solution in a suitable solvent, e.g. N,N-dimethylacetamide, hexamethylphosphoramide, etc.

The polyamides for use in the composition of the present invention are solids with an undefined melting point. Their infrared absorption spectra are characterized by absorption bands at ca. 3.1 microns due to the N—H bond of the amide groups and at ca. 6.0 microns due to the C=O bond of the amide groups.

The process for preparing the polyamide compositions comprises mixing at least one organic diamine having the structural formula:

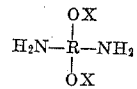

wherein R is an aromatic tetravalent radical each amino group of said diamine attached directly to a carbon atom of a ring of said aromatic radical ortho or peri to the carbon atom to which an —OX is directly attached; with at least one diaryl ester of an aromatic dicarboxylic acid, preferably the diphenyl esters of the dicarboxylic acid, having the structural formula:

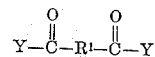

wherein
R$^1$ is arylene; and
Y is aryloxy, preferably phenoxy;
liquefying said mixture either by heating to melt the mixture or adding a solvent or both; heating said mixture, to a temperature sufficiently high to liquefy said mixture, usually to a temperature of about 200° C. and under a pressure of less than 0.5 millimeter of mercury for a time sufficient to provide the corresponding polyamide.

It should be understood that one purpose of the process is to provide a composition that can be shaped into useful objects. In determining a specific time and a specific temperature for forming the polyamide of a specified diamine and a specified substituted acid, several factors must be considered. The maximum permissable temperature will depend on the diamine used, the acid used, the percentage of polyamide desired in the final composition and the minimum period of time that one desires for the reaction. Temperatures up to about 250° C. may be tolerated to provide shapeable compositions of the polyamide. The particular temperature below 250° C. that must not be exceeded for any particular combination of diamine, diaryl ester and reaction time to provide a reaction product composed of the shapeable polymer will vary but can be determined by a simple test by any person of ordinary skill in the art.

The resulting polymeric hydroxy or alkoxy amide or the like can be cast or extruded in molten form or in solvents into a film, filament, rod, tube or other desired shape, or it can be used in solution as a coating composition. These polymers are soluble in concentrated sulfuric acid, and some are also soluble in such solvents as dimethylsulfoxide and N,N-dimethylformamide. After shaping the composition composed predominantly of the polyamide, preferably still in the solvent when a solvent had been used, into a useful article, e.g., filament, film, tube, rod, etc., it is preferred to convert the polyamide to another polymer to modify the properties of the shaped structure. Thus, the polyamide is converted to the corresponding polybenzoxazole by treatment to split out the elements of XOH, i.e., by heating at about 275–475° C., preferably at least 350° C., under pressure no greater than about 0.5 millimeter of mercury for a sufficient time, usually at least two hours, to effect such conversion.

The polybenzoxazoles of this invention find many applications in a wide variety of physical shapes and forms. excellent physical properties at room temperature, but retain their strength at elevated temperatures for prolonged periods of time. Because of the relatively low melting point of the polymer precursors, they can be processed into shaped articles such as films, fibers, tubes, rods, sheets and discs by conventional techniques, and Among the most significant of these forms are films and fibers. Films and fibers of this polymer not only possess then converted into the final high-melting, relatively intractable cyclized polymers, the polybenzoxazoles.

The final shaped article may consist of the heterocyclic polymer alone or as a blend with other polymers and/or modified with inert materials. Depending on their nature, the inert materials may be added before or after shaping. For example, fillers such as pigments, electrically conductive carbon black and metal particles, abrasives, dielectrics and lubricating polymers may be added conveniently to the intermediate polymer as such or to a solution of the intermediate polymer before shaping. Certain abrasives and electrically conductive materials are better added as surface layers. A cellular form or foam of the final polymer may be produced by adding a conventional blowing agent to the intermediate polymer, either alone or in combination with a filler, followed by heating to decompose the agent and cyclize the polymer units. Alternatively, cellular products can be made by dispersing bubbles (of air, carbon dioxide, nitrogen, etc.) into a melt or solution of the intermediate polymer before shaping and cyclization.

Instead of being shaped itself, the intermediate polymer can be used as a coating composition. Sometimes a melt of this polymer is suitable, but a solution generally is more useful. The liquid coating composition containing the polymer, either alone or modified by the addition of fillers and/or foaming agents, may be applied by any of the usual techniques (doctoring, rolling, dipping, brushing, spraying) to a great variety of substrates. Such substrates include copper, brass, aluminum, steel, and other metals in the form of sheets, fibers, wires, screening; mineral structures such as asbestos; glass in the form of sheets, fibers, foams, fabrics, etc.; polymeric materials such as cellulosic materials (cellophane, wood, paper, etc.); polyolefins (polyethylene, polypropylene, polystyrene, etc.), polyesters (polyethylene terephthalate, etc.) polyamides, polyimides, perfluorocarbon polymers (polytetrafluoroethylene, copolymers of tetrafluoroethylene with hexafluoropropylene, etc.), polyurethanes, in the form of sheets, fibers, foams, woven and non-woven fabrics, screening, etc.; leather sheets; etc. The polymeric substrates can be metallized before coating, or treated with a conventional adhesive or other agent to improve surface receptivity. Films of the final cyclized polymer can be laminated to any of the above substrates, often with the aid of a commercially available adhesive.

Films formed from the polymer of this invention may be used wherever films have heretofore been used. They serve advantageously in wrapping, packaging and bundling applications. Additionally, the film-forming polymer may be used in automobile and aviation interior head lining materials, decorative trim, high temperature electrical insulation, in the form of corrosion-resistant pipe, duct work, containers and container linings, and the laminating structures mentioned previously. In fiber form, the polymer of the present invention offers possibilities for high temperature electrical insulation, protective clothing and curtains, filtration media, packing and gusseting materials, brake linings and clutch facings.

In the preparation of the shapeable compositions and the final polymer of the present invention it is essential that the molecular weight be such that the inherent viscosity of the polymers be at least 0.1, preferably 0.5–5.0. The inherent viscosity is measured at 30° C. at a concentration of 0.5% by weight of the polymer in a suitable solvent. The suitable solvent for the purpose of the present invention has been chosen as concentrated sulfuric acid. The viscosity of the polymer solution is measured relative to that of the solvent alone and the inherent viscosity $$= \frac{\text{natural logarithm} \frac{\text{Viscosity of solution}}{\text{Viscosity of solvent}}}{C}$$

where C is the concentration expressed in grams of polymer per 100 milliliters of solution. As known in the polymer art, inherent viscosity is directly related to the molecular weight of the polymer.

The starting materials for forming the products of the present invention are at least one compound of the class: aromatic diacid aryl esters, preferably phenyl esters; and at least one compound of the class: bis(o-hydroxy) arylene diamines, bis(o-lower alkoxy) arylene diamines and similar diamines.

The most readily available diamine is 3,3'-dihydroxybenzidine. This diamine may be obtained by demethylation of commercially available o-dianisidine with aluminum chloride according to the procedure described in U.S. Patent 2,497,248. Also operable and prepared similarly are other bis(ortho hydroxy amine phenyl) compounds and their derivatives of the structure

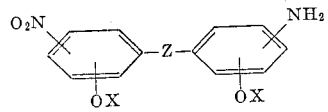

where Z is any one of the following: carbon-carbon bond linking the two aromatic rings; a divalent hydrocarbon radical, i.e., alkylene or alkylidene; a divalent perhalocarbon radical, i.e. perfluoroalkylene or alkylidene; oxygen; sulfur; $SO_2$; CO; CONH; COO;

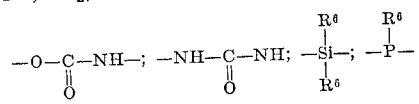

where $R^6$ is hydrogen or lower alkyl.

From the standpoint of availability, the preferred species is that in which U is a carbon-to-carbon bond. Excies is that in which Z is a carbon-to-carbon bond. Examples of those having alkylene bridges are the members in which Z is —$CH_2$— and

The linkage is preferably para to either the amino or hydroxy group. Representative operable diamines are:

bis(3-hydroxy-4-amino)biphenyl;
bis(3-methoxy-4-amino)biphenyl;
1,2-bis(3-hydroxy-4-aminophenyl)ethane;
2,2-bis(3-hydroxy-4-aminophenyl)propane;
bis(3-hydroxy-4-aminophenyl)bis(trifluoromethyl) methane;
bis(3-hydroxy-4-aminophenyl)ether;
bis(3-hydroxy-4-aminophenyl)sulfide;
bis(3-hydroxy-4-aminophenyl)sulfone;
bis(3-hydroxy-4-aminophenyl)ketone;
bis(3-hydroxy-4-aminophenyl)methane;
N-(3-hydroxy-4-aminophenyl)-3-hydroxy-4-aminobenzamide;
(3-hydroxy-4-aminophenyl)-3-hydroxy-4-aminobenzoate;
(3-hydroxy-4-aminophenyl)-3-hydroxy-4-aminophenylcarbamate;
N,N'-bis(3-hydroxy-4-animophenyl)urea;
bis(3-amino-4-hydroxyphenyl)ether;
bis(3-amino-4-hydroxyphenyl)sulfide;
bis(3-amino-4-hydroxyphenyl)sulfone;
bis(3-amino-4-hydroxyphenyl)sulfoxide;
bis(3-amino-4-hydroxyphenyl)ketone;
bis(3-amino-4-hydroxyphenyl)methane;
1,2-bis(3-amino-4-hydroxyphenyl)ethane;
2,2-bis(3-amino-4-hydroxyphenyl)propane;
bis(3-amino-4-hydroxyphenyl)dimethyl silane;
bis(3-amino-4-hydroxyphenyl)dibutyl silane;
bis(3-amino-4-hydroxy-phenyl)methyl phosphine;
bis(3-amino-4-hydroxyphenyl)butyl phosphine;
1,5-diamino-2,6-naphthalene diol;
1,6-diamino-2,5-naphthalene diol;
2,5-diamino-1,6-naphthalene diol;
2,6-diamino-1,5-naphthalene diol;

1,6-diamino-2,7-dihydroxy naphthalene;
2,5-diamino-1,7-dihydroxy naphthalene;
1,7-diamino-2,6-dihydroxy naphthalene;
2,7-diamino-1,6-dihydroxy naphthalene;
2,7-diamino-3,6-dihydroxynaphthalene;
3,7-diamino-2,6-dihydroxynaphthalene;
1,5-diamino-4,8-dihydroxynaphthalene;
1,5-diamino-2,6-dihydroxy anthracene;
1,8-diamino-2,7-dihydroxy phenanthrene;
1,4-diamino-2,5-dihydroxy benzene;
1,3-diamino-4,6-dihydroxy benzene;
bis(3-acetoxy-4-amino)biphenyl;
bis(3-thionoacetoxy-4-amino) biphenyl;
methyl carbonate ester of bis(3-hydroxy-4-amino)biphenyl;
bis(3-(carboxymethyleneoxy)-4-amino)biphenyl;
bis(3-(carbomethoxymethyleneoxy)-4-amino)biphenyl;
bis(3-(carbomethoxyethylideneoxy)-4-amino)biphenyl;
bis(3-(carbomethoxyisopropylideneoxy)-4-amino)biphenyl;
bis(3-thiocarbomethoxymethyleneoxy-4-amino)biphenyl;
bis(3-dithiocarbomethoxymethyleneoxy-4-amino)biphenyl.

In the latter types of compounds, X is $-CR^3R^4CO_2R^5$, $-CR^3R^4COSR^5$ and $-CR^3R^4CS_2R^5$, respectively, in which $R^3$, $R^4$ and $R^5$ are each hydrogen or lower alkyl. For the sake of simplicity these have been exemplified in the biphenyl series only. The corresponding derivatives of all the other hydroxy compounds shown above are also operable.

Representative members of the class of derivatives of aromatic dicarboxylic acids which are useful in the invention are:

diphenyl isophthalate;
di(p-cresyl)terephthalate;
di(alpha-naphthyl)isophthalate;
diphenyl 2,2'-bibenzoate;
diphenyl 3,3'-bibenzoate;
diphenyl 4,4-bibenzoate;
bis(3-carbophenoxyphenyl)methane;
bis(4-carbophenoxyphenyl)methane;
2,2-bis(3-carbophenoxyphenyl)propane;
2,2-bis(4-carbophenoxyphenyl)propane;
1,5-dicarbophenoxy naphthalene;
2,6-dicarbophenoxy naphthalene;
bis(3-carbophenoxyphenyl)ether;
bis(4-carbophenoxyphenyl)ether;
bis(3-carbophenoxyphenyl)sulfide;
bis(4-carbophenoxyphenyl)sulfide;
bis(3-carbophenoxyphenyl)sulfone;
bis(4-carbophenoxyphenyl)sulfone;
3,5-dicarbophenoxypyridine;
and 2,5-dicarbophenoxy furan.

As mentioned previously, the reaction of any of these aryl esters of carboxylic acids with the hydroxy amines and their derivatives may be carried out by heating a mixture to melt the reactants and then form the polymeric hydroxy or alkoxy amide or the like. This polymeric intermediate can be shaped and after it is in the desired shape, converted into the corresponding polybenzoxazole by heating at a temperature preferably above about 350° C. The reaction is aided by a current of inert gas such as nitrogen, and by operating in a vacuum, both of which help to remove the by-product alcohol. The structural formula of the resulting polybenzoxazole follows:

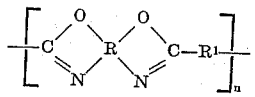

wherein

R is an aromatic tetravalent radical; each nitrogen atom being attached directly to a carbon atom of a ring of said aromatic radical and being ortho or peri to the oxygen atom;

$R_1$ is arylene; and $n$ is an integer sufficiently high to provide a film-forming polymer.

This invention will be more clearly understood by referring to the examples which follow. These examples, which illustrate specific embodiments of the present invention, should not be construed to limit the invention in any way.

*Example 1*

A mixture of 2.16 grams (0.01 mole) of 3,3'-dihydroxybenzidine and 3.18 grams (0.01 mole) of diphenyl isophthalate is heated under nitrogen to a temperature of 200° C. until a viscous melt is obtained. This is the intermediate containing a substantial quantity of the polyamide-phenol so that it can be shaped. The melt is pressed into a film, which is heated further, first to 300° C., and then to 380° C. as vacuum is applied gradually. After 4 hours at a temperature of 380°–400° C. the amber polybenzoxazole film is obtained and is cooled.

*Example 2*

A mixture of 2.16 grams (0.01 mole) of 3,3'-dihydroxybenzidine and 3.18 grams (0.01 mole) of diphenyl isophthalate is stirred with 11 ml. of N,N-dimethylacetamide until all solid has dissolved. The mixture is refluxed (about 165° C.) under nitrogen for 1 hour. The solid which separates is largely the desired polyamide-phenol intermediate. A film of this solid is heated further and vacuum is applied gradually. Finally it is heated 4 hours at a temperature of 380°–400° C. at less than 1 mm. The amber product has an inherent viscosity of 0.17 in concentrated sulfuric acid. This value increases to 0.44 on heating 10 more hours under the same conditions.

*Examples 3–13*

Films of the corresponding polybenzoxazoles result from substituting each of the following dihydroxy diamines for 3,3'-dihydroxybenzidine in the procedure of Example 2:

bis(3-amino-4-hydroxyphenyl)sulfone;
bis(3-amino-4-hydroxyphenyl)sulfide;
bis(3-amino-4-hydroxyphenyl)ether;
bis(3-amino-4-hydroxyphenyl)methane;
bis(4-amino-3-hydroxyphenyl)sulfone;
bis(4-amino-3-hydroxyphenyl)sulfide;
bis(4-amino-3-hydroxyphenyl)ether;
bis(4-amino-3-hydroxyphenyl)methane;
1,5-diamino-2,6-dihydroxynaphthalene;
1,5-diamino-4,8-dihydroxynaphthalene;
and
1,4-diamino-5,8-dihydroxynaphthalene.

*Examples 14–20*

Similarly, the corresponding polybenzoxazole results from substituting an equimolar amount of each of the following aromatic esters of aromatic dicarboxylic acids for diphenyl isophthalate: 3,5-dicarbophenoxy pyridine; 2,5-dicarbophenoxy furan; diphenyl terephthalate; diphenyl 2,2'-bibenzoate; diphenyl 4,4'-bibenzoate; 2,6-dicarbophenoxy naphthalene; and 1,5-dicarbophenoxy naphthalene.

What is claimed is:
1. In a process for preparing a polybenzoxazole wherein at least one diamine having the structural formula

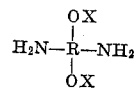

wherein R is an aromatic tetravalent radical selected from the group consisting of hydrocarbon radicals and radicals of the structure

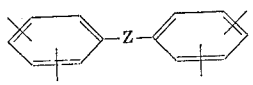

where Z is selected from the group consisting of a divalent perhalocarbon radical, oxygen, sulfur,

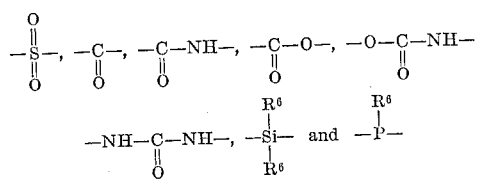

where $R^6$ is selected from the group consisting of hydrogen and lower alkyl, each amino group of said diamine attached directly to a carbon atom of a ring of said aromatic tetravalent radical ortho or peri to the carbon atom to which an —OX is directly attached, and X is selected from the group consisting of hydrogen,

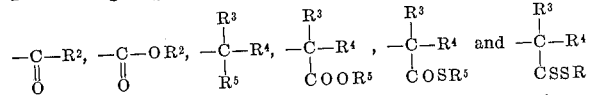

wherein $R^2$ is lower alkyl and $R^3$, $R^4$ and $R^5$ are each selected from the group consisting of hydrogen and lower alkyl; is heated with at least one diaryl ester of an aromatic dicarboxylic acid at a temperature sufficient to produce a viscous melt and below about 250° C. to form a polymeric composition composed of polyamide; said polyamide having an inherent viscosity of at least 0.1 as measured at 30° C. on an 0.5% by weight solution in concentrated sulfuric acid, and said polyamide is then formed into a shaped article; the improvement comprising heating said article to a temperature of at least 275° C. for a time sufficient to convert the polyamide of said article to the corresponding polybenzoxazole having an inherent viscosity of at least 0.1 as measured at 30° C. on an 0.5% by weight solution in concentrated sulfuric acid.

2. A process as in claim 1 wherein said shaped article is a self-supporting film.

References Cited by the Examiner
UNITED STATES PATENTS
3,094,511 6/1963 Hill et al. _____ 260—78
3,230,196 1/1966 Moyer _____ 260—47

OTHER REFERENCES
Kubota et al.: Journal of Polymer Science, part B, vol. 2, pp. 655–659, 1964.

WILLIAM H. SHORT, *Primary Examiner.*

H. D. ANDERSON, *Assistant Examiner.*

UNITED STATES PATENT OFFICE
CERTIFICATE OF CORRECTION

Patent No. 3,316,213    Dated April 25, 1967

Inventor(s) Charles E. Berr

It is certified that error appears in the above-identified patent and that said Letters Patent are hereby corrected as shown below:

Column 2, between lines 64 and 65 insert -- Among the most significant of these forms are films and fibers. Films and fibers of this polymer not only possess --;

Same Column, cancel all of lines 71 and 72;

Column 4, lines 16 to 20, the formula should appear as follows:

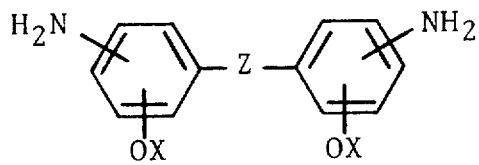

Column 4, cancel line 32, which reads "cies is that in which μ is a carbon-to-carbon bond. Ex-";

Column 7, the last formula in line 25 which reads

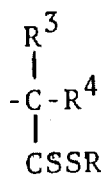    should read    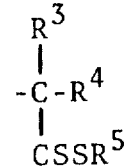

SIGNED AND
SEALED
JUL 21 1970

(SEAL)
Attest:

Edward M. Fletcher, Jr.
Attesting Officer

WILLIAM E. SCHUYLER, JR.
Commissioner of Patents